(12) United States Patent
Benakli et al.

(10) Patent No.: US 8,564,910 B2
(45) Date of Patent: Oct. 22, 2013

(54) MAGNETIC SHIELD STRUCTURE

(75) Inventors: Mourad Benakli, Bloomington, MN (US); Kirill Rivkin, Edina, MN (US); Kaizhong Gao, Eden Prairie, MN (US); James Wessel, Savage, MN (US); Ming Sun, Eden Prairie, MN (US); Ibro Tabakovic, Edina, MN (US); Mark Thomas Kief, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 687 days.

(21) Appl. No.: 12/616,842

(22) Filed: Nov. 12, 2009

(65) Prior Publication Data

US 2011/0109999 A1  May 12, 2011

(51) Int. Cl.
*G11B 5/33* (2006.01)
*G11B 5/127* (2006.01)

(52) U.S. Cl.
USPC .......................................... 360/319; 360/317

(58) Field of Classification Search
None
See application file for complete search history.

(56) References Cited

U.S. PATENT DOCUMENTS

| | | | |
|---|---|---|---|
| 6,222,702 B1 | 4/2001 | Macken et al. | |
| 6,630,255 B1 | 10/2003 | Litvinov et al. | |
| 6,656,613 B2 | 12/2003 | Litvinov et al. | |
| 7,075,756 B1 | 7/2006 | Mallary et al. | |
| 7,088,537 B2 | 8/2006 | Cronch et al. | |
| 7,236,333 B2 | 6/2007 | Macken | |
| 7,354,664 B1 * | 4/2008 | Jiang et al. | 428/829 |
| 7,372,664 B1 | 5/2008 | Mallary et al. | |
| 7,656,619 B1 * | 2/2010 | Yan et al. | 360/294.7 |
| 2005/0094326 A1 * | 5/2005 | Ju et al. | 360/324.1 |
| 2009/0214896 A1 | 8/2009 | Nolan et al. | |

* cited by examiner

*Primary Examiner* — David D Davis
(74) *Attorney, Agent, or Firm* — Hall Estill Attorneys at Law

(57) ABSTRACT

An apparatus and associated method for a magnetic shield structure for data transduction from a recordable media in a data storage device. Various embodiments of the present invention are generally directed to a data transducer and a magnetic shield structure comprising a write shield magnetic material constructed of exchange decoupled material.

15 Claims, 5 Drawing Sheets

MAGNETIC SHIELD STRUCTURE

SUMMARY OF THE INVENTION

Various embodiments of the present invention are generally directed to a magnetic shield structure for data transducing. In accordance with various embodiments, a data transducer and a magnetic shield structure comprising a write shield magnetic material constructed of exchange decoupled material. These and other features which characterize the various embodiments of the present invention can be understood in view of the following detailed discussion and the accompanying drawings.

DETAILED DESCRIPTION

The present disclosure generally relates to the reading and writing of data to a memory space, and in particular to methods and architecture to improve the reliability of accessing selected portions of memory. Data storage devices often experience specific errors and failure modes related to a sidetrack erasure (STE) phenomenon. Such phenomenon can occur when a data transducer inadvertently modifies or erases data on a proximate portion of a recording media while accessing data from a predetermined track. Indeed, the STE phenomenon can dynamically vary during various operations conducted by the data transducer and result in sporadic STE occurrences and inconsistent failure modes.

Accordingly, embodiments of the present invention provide a magnetic shield structure that focuses the magnetic scope of a data transducer while inhibiting the generation or exaggeration of STE. A data transducer that is configured to access a designated width of a recordable media and has a magnetic shield structure that breaks the long range magnetization order in all directions except the designated width can focus the transducer's magnetic scope. The breaking of magnetization order can be achieved by constructing the magnetic shield structure from decoupled material that inhibits the formation of cohesive domain walls which have been observed to correlate to the STE phenomenon.

Figure 1A:
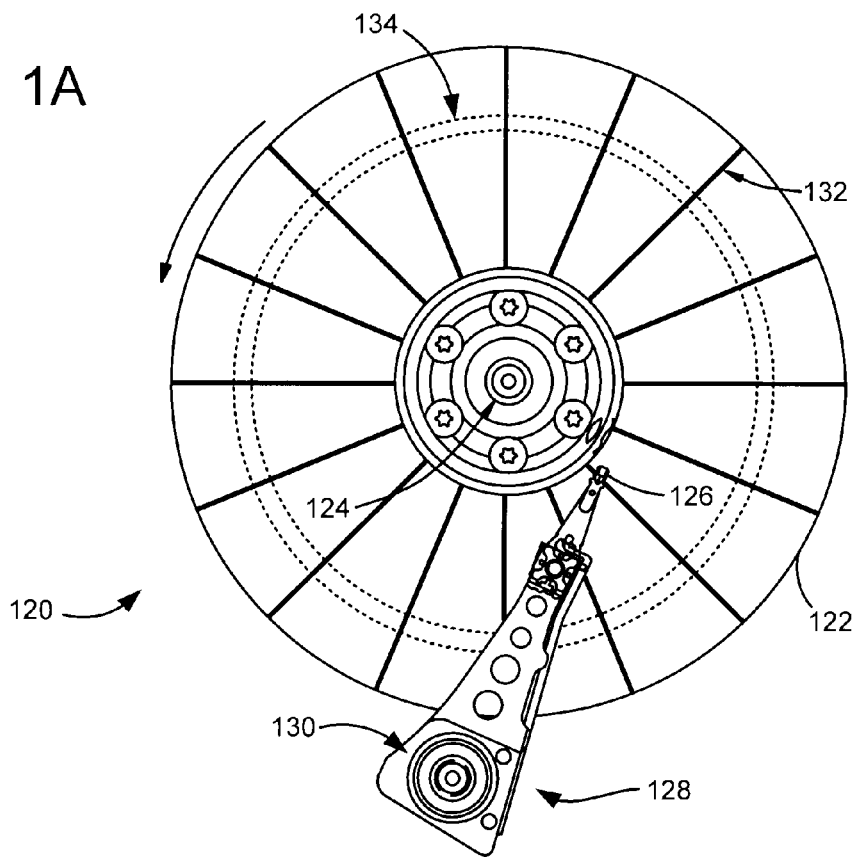
FIGS. 1A-1B generally illustrate an exemplary construction and operation of the data storage device of FIG. 1.
Figure 1B:
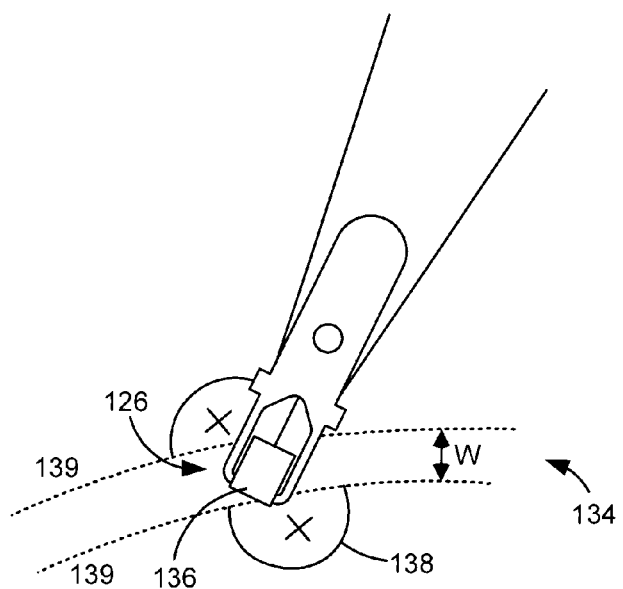

Turning to FIGS. 1A and 1B generally illustrate an exemplary data storage device 120. The data storage device 120 has a recordable media 122 that, in some embodiments, is a rotatable disc. The recordable media 122 is coupled to and rotated by a spindle motor 124. Data can be written to and read from the recordable media 122 via a head gimbal assembly (HGA) 126 that is connected at the distal end of an actuator 128 that is connected to a voice coil motor (VCM) 130, which can be controlled by a circuit such as a VCM control driver.

In various embodiments, the HGA 124 includes a data transducer that accesses data written on the recordable media 122. The data transducer and HGA can be strategically positioned on the recordable media 122 by accessing various numbers of servo data written to the media 122 in servo bursts 132. Such strategic positioning can allow a data transducer to follow a predetermined data track 134.

As shown by FIG. 2B, the HGA 126 travels around the recordable media 122 along data tracks 134 and conduct various data access operations. During read operation, the data transducer 136 will identify the logical state programmed on a particular region of the data track 134. Meanwhile, a write operation will induce a magnetic logical state to be programmed onto the recordable media 122 at a predetermined location.

However, during various operations, the data transducer 136 can experience the STE phenomenon and inadvertently program an unwanted area or bit 138 outside of the data track 134. That is, data is programmed in sidetrack zones 139 that lie outside the width of the data track 134. It can be appreciated that in operation, the data transducer 136 is configured to access a predetermined width (W) of the recordable media 122 that corresponds to the data track 134. However during STE, data in the sidetrack zones 139 that lie outside of that predetermined width are modified.

It should be noted that the various tracks, servo wedges, and hardware configurations are not required or limited. Furthermore, the operation and occurrence of the STE phenomenon is not restricted to the formation described herein. That is, the various tracks and hardware can be constructed and configured in any number of ways in which STE occurs in a manner juxtaposed to the example provided in FIGS. 3A and 3B without deterring from the spirit of the present invention.

Figure 2:
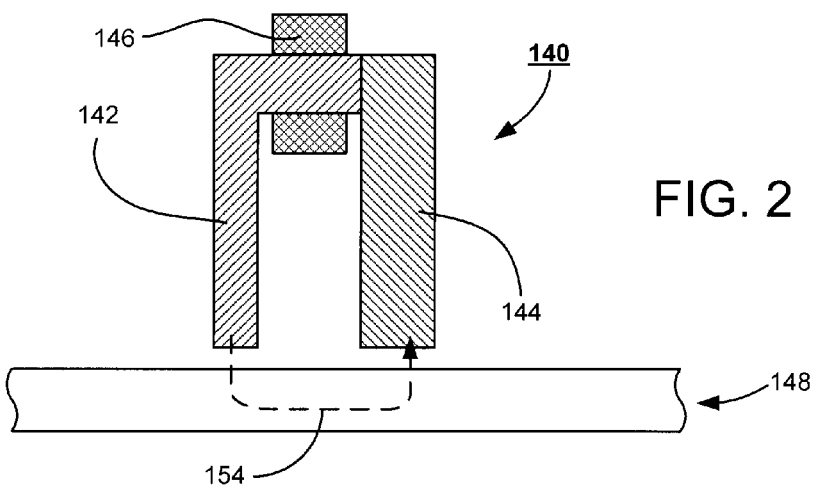
FIG. 2 displays an exemplary portion of the data storage device shown in FIGS. 1A-1B.

FIG. 2 generally depicts an exemplary data transducer 140 capable of being used in the data storage device of FIGS. 1A and 1B. The data transducer 140 is contemplated as being configured to carry out perpendicular recording, as shown, with a write pole 142, a return pole 144, and a write coil 146 that surrounds the write pole 142. An associated disc 148 adjacent the data transducer 140.

During the transmission (writing) of data, bi-directional, time varying data transmission currents are supplied to the write coil 146 via preamp and flex on suspension (FOS) conductors that can be included in a HGA. These data transmission currents, also referred to as write currents, establish a corresponding modulated magnetic field that generally extends from the write pole 146, down and then back up again through a recording layer of media 148 to the return pole 144, as represented by path 154.

The relative cross-sectional areas of the write pole 142 and return pole 144 can be selected such that the flux density of the field from the write pole 142 is sufficient to reorient the localized magnetization of the recording layer in a direction normal to the direction of movement of the disc 148 with respect to the head (i.e. up or down with reference to FIG. 2). At the same time, the return field that enters the return pole 144 has a sufficiently lower flux density so as to not disturb the existing magnetization of the recording layer of media 148.

While operable, the data transducer 140 of FIG. 2 can experience STE during normal operations due to stray magnetic fields affecting errant portions of the disc 148. Such STE can be partially mitigated by guarding the data transducer 140 with magnetic shielding configurations. However, the dynamic operating conditions associated with normal data operations can often fail to mitigate STE. Moreover, the magnetic shielding configurations can exaggerate the STE phenomenon as magnetic domain walls shift during operation of the data transducer 140.

Figure 3A:
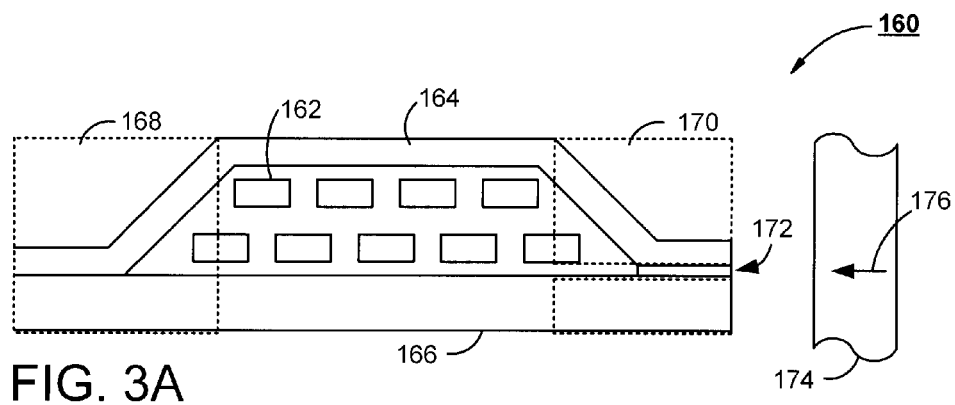
FIGS. 3A-3B shows an exemplary data transducer constructed and operated in accordance with various embodiments of the present invention.
Figure 3B:
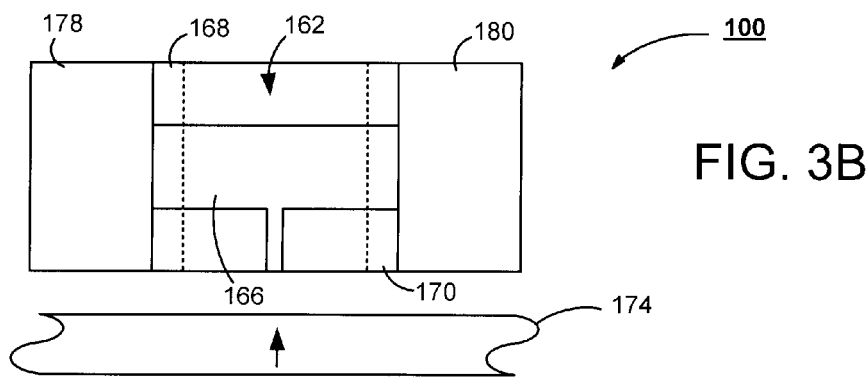

FIGS. 3A and 3B generally illustrate an exemplary data transducer 160 constructed in accordance with various embodiments of the present invention. The data transducer 160 has conductive coils 162 disposed between a first side magnetic shield 164 and a second side magnetic shield 166. While the side magnetic shields may inhibit cohesive magnetic migration along on a first plane, a top shield 168 and a bottom shield 170 further prevent cohesive magnetic migration along a second plane normal to the first plane.

In some embodiments, a magnetic path between the first and second magnetic shields 164 and 166 is provided by a non-magnetic writing gap 172 that allows focused magnetic fields to reach a corresponding disc 174 and write a logical state 176. The focusing of such writing magnetic fields is further achieved by configuring the bottom shield 170 with a recess that matches the writing gap 172. In operation, the magnetic shielding from the sides, top, and bottom shields define a path between the conductive coils 162 and the corresponding disc 174

In FIG. 3B, a further encapsulation of the conductive coils 162 is accomplished by coupling a front magnetic shield 178 and a back magnetic shield 180 to the sides, top, and bottom shields. As a result, the conductive coils 162 and magnetic writing path are fully surrounded in all direction except for an active surface width that corresponds to a predetermined width of the disc 174, such as a data track. Hence, magnetic shielding is provided about the data transducing elements so that a single non-magnetically shielded path exists toward the disc 174. Functionally, the various shielding components are not limited to the configuration shown in FIGS. 3A and 3B and can be oriented to allow different sizes and widths of magnetic writing, as desired.

Figure 4:
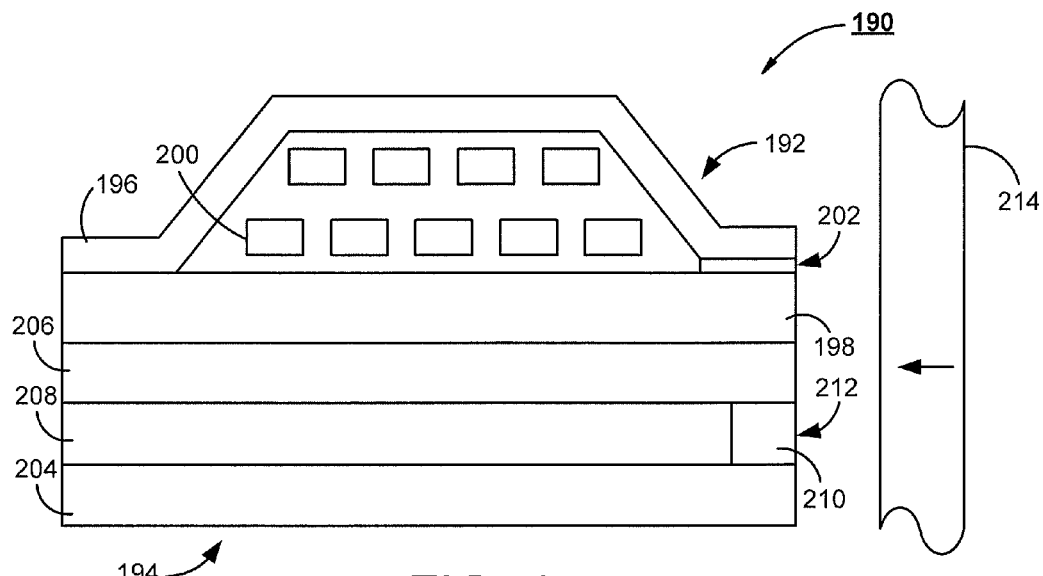
FIG. 4 provides an exemplary data transducer constructed and operated in accordance with various embodiments of the present invention.

FIG. 4 provides another data transducer 190 constructed in accordance with various embodiments of the present invention. The data transducer 190 has a writing transducer 192 coupled to a reading transducer 194. While various magnetic shields can be shared by the writing and reading transducers 192 and 194, the data transducer 190 is configured with independent magnetic shields. That is, the writing transducer 192 has a first side magnetic shield 196 and a second side magnetic shield 198 surrounding conductive coils 200 and defining a writing gap 202. Meanwhile, the reading transducer 194 is constructed with a third side magnetic shield 204, a fourth side magnetic shield 206, and a keystone (or top) magnetic shield 208 about a read element 210.

It can be appreciated that further magnetic shields (i.e. top, bottom, front, and back) can be constructed with the data transducer 190 to provide additional protection against stray magnetic fields. It should be noted that the various possible configurations of the magnetic shielding for the writing transducer 192 and reading transducer 194 block magnetic fields from every surface about the conductive coils 200 and the read element 210 except for active surfaces 212 that face the corresponding disc 214 with a predetermined width. In an exemplary configuration, the second and fourth side magnetic shield 198 and 206 are combined into a shared shield.

However, it has been observed that despite fully surrounding a data transducer with magnetic shielding, STE can occur. Such observations have identified that a non-deterministic and dynamic effect is present when common magnetic shielding materials are used about a reading or writing transducer that does not inhibit long range orders of magnetization which creates magnetic vortices and domain walls. With a magnetic shielding being constructed of material with different magnetic domains, domain walls form and move in response to the operation of a data transducer. As a domain wall moves, the response of the data transducer to signals programmed to a corresponding disc is corrupted. Specifically during writing operations, domain wall motion can exaggerate STE and adversely affect the operation of a data storage device.

Accordingly, a magnetic shielding structure that breaks long range magnetization order in all directions can be used in the data transducers of FIGS. 3-4. The magnetic shielding structure can further provide a reduction in the thermal stability of the structure either individually or in combination with the breaking of long rang magnetization orders. With the magnetization order broken in all directions except the active surface regions that faces the corresponding disc, the data transducer can have high magnetic permeability and short magnetic exchange length while inhibiting any STE development or exaggeration. To create such a magnetic shielding structure that breaks magnetization order in all directions, an exchange decoupled material can be used.

Figure 5A:
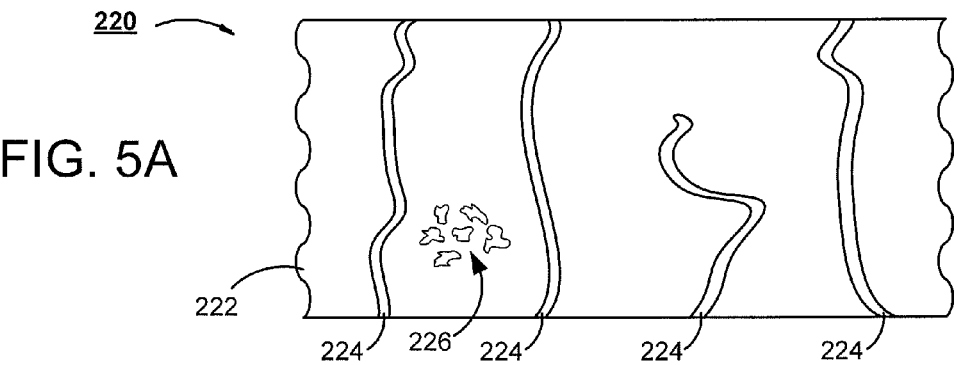
FIGS. 5A and 5B generally illustrate material used to construct the data transducers of FIGS. 3A-4.

FIG. 5A generally displays an exemplary exchange decoupled material 220 constructed in accordance with various embodiments of the present invention. As shown, a magnetic material 222 has a plurality of decoupling grains 224 that function to reduce exchange coupling and intergranular exchange. In various embodiments, the exchange decoupled material 220 has contradicting magnetization domains that produce a substantially zero net magnetization. In other embodiments, the decoupling grains 224 are oxidized regions of the magnetic material, but the grains are not limited to non-metallic materials and can be metals such as, but not limited to, Copper and Chromium.

Figure 5B:
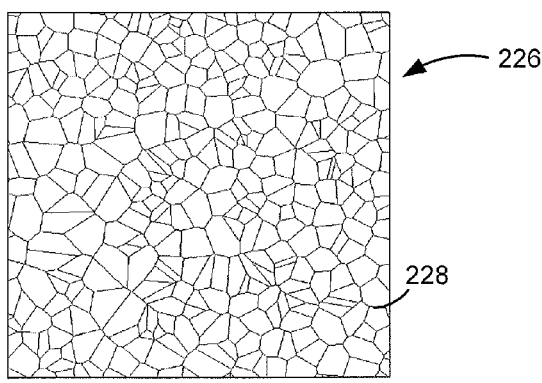

Yet in other embodiments, the shield structure is constructed from a metal alloy such as, but not limited to, CoNiFr+O and CoNiFe+O+Cu that may or may not have doped grains. The decoupling material further may have grain boundary regions 226 that act alone or in combination with the doped grains 224 to reduce magnetic exchange coupling. FIG. 5B generally illustrates exemplary grain boundaries 228 which decouple the material due in part to the non-uniform size and orientation of the grains. With such configuration, the grain boundaries 228 can effectively inhibit the formation of domain walls throughout the decoupled material 220.

Furthermore, the exchange decoupled material 220 can be created through various methods such as, but not limited to, sputtering and electro-deposition. In operation when constructed about a data transducer, large domain walls and vortices are inhibited while the magnetization order is broken in all directions except the active surface regions that match the predetermined width that is designed to access data from a corresponding disc. As a result, data is reliably written to and read from the predetermined width without STE or any noise associated with magnetic interference.

It should be noted that as used herein, the term "exchange decoupled" means a material in which quantum mechanical exchange coupling between adjacent grains is reduced. It should further be noted that the configuration and orientation of the decoupling grains 224 are not limited and can be modified, as desired. For example, as few as one decoupled grain 224 can be constructed to traverse through the magnetic material 222 along a long axis, as opposed to the grains running along a short axis shown in FIG. 5.

Figure 6A:
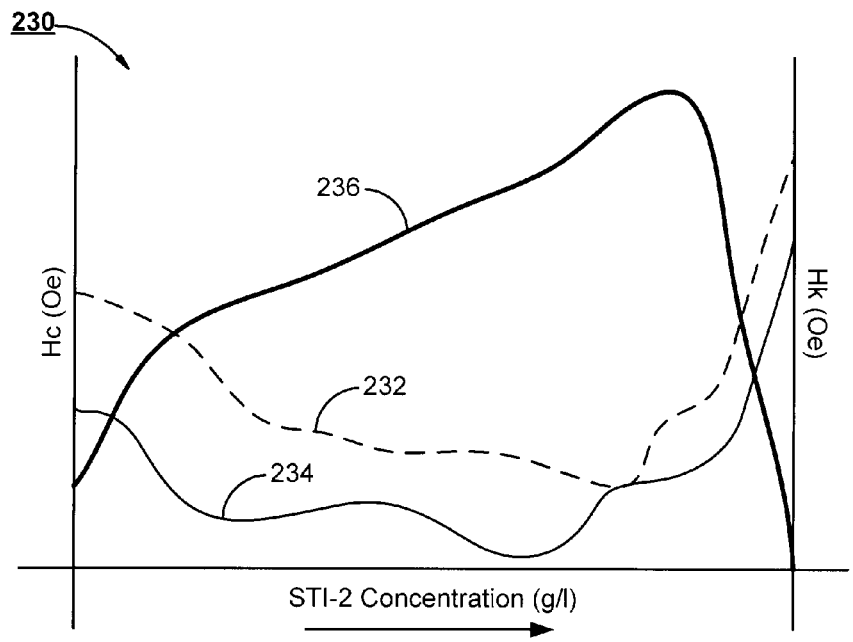
FIGS. 6A and 6B graph exemplary operational characteristics of the data transducers of FIGS. 3A-4 as constructed in accordance with various embodiments of the present invention.
Figure 6B:
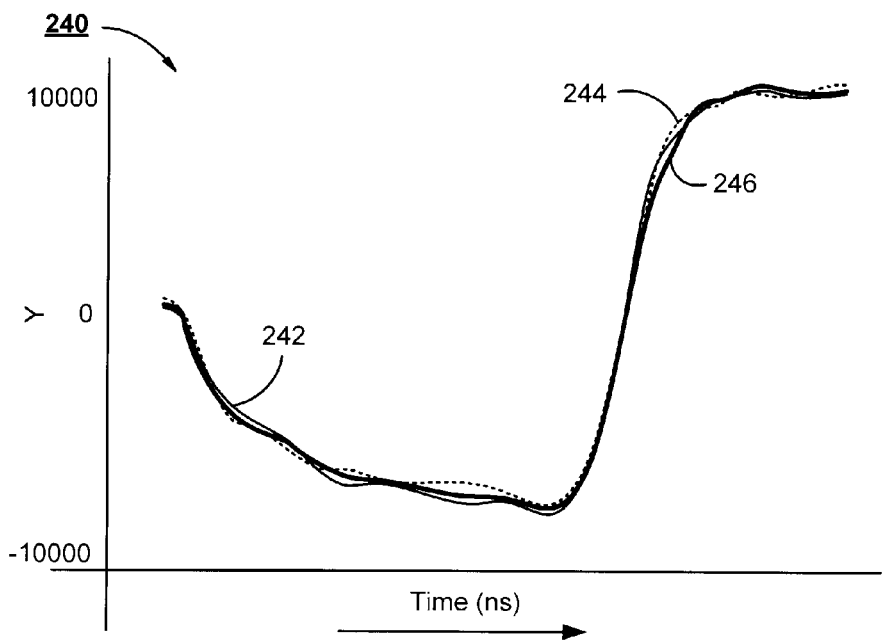

FIGS. 6A and 6B graph operational characteristics of an exemplary exchange decoupled material. As concentration increases (from left to right) the magnetic coercivity ($H_c$) and anisotropy ($H_k$) are graphed in Oersted units. In graph 230 of FIG. 6A, line 232 graphs the in plane behavior of exchange decoupled material while line 234 graphs the out of plane behavior. In addition, line 236 graphs the anisotropic field associated with exchange decoupled material as concentration increase. As can be understood from the graph of FIG. 7, the magnetic exchange length is reduced while magnetization order is broken throughout the material.

FIG. 6B further generally illustrates exemplary operational characteristics 240 of an exchanged decoupled material that have been decoupled in various manners. Line 242 provides writer field characteristics of an undoped exchange decoupled material over time. In addition, line 244 displays exemplary writer field behavior of an exchange decoupled material that is decoupled through oxidation while line 246 shows the behavior of decoupled material that has been doped with a material, such as a metal or metal alloy.

As shown, lines 242, 244, and 246 have similar operational behavior that supports that there is little to no effective write field loss due to the different decoupling materials (i.e. undoped, oxidized, doped). Hence, a decoupled materials with differing decoupling means can be combined to provide magnetic shielding with consistent operational characteristics.

As such, a magnetic shield structure, such as the various magnetic shields shown in FIGS. 4-5, can be constructed from exchange decoupled material to improve the focusing of a data transducer's operational scope to a predetermined width while inhibiting any STE development or exaggeration. A magnetic shield structure constructed from exchange decoupled material can break the long range magnetization order of any magnetic fields in every direction except for the predetermined width in which the data transducer engages a corresponding disc.

In various embodiments, the magnetic shield structure is constructed from a single piece of exchange decoupled material. In other embodiments, a recess is formed in the exchange decoupled material that matches the predetermined width of the data transducer. In sum, the use of exchange decoupled material in a magnetic shield structure allows for the elimination of long range order of magnetization as well as magnetic walls and vortices.

Figure 7:
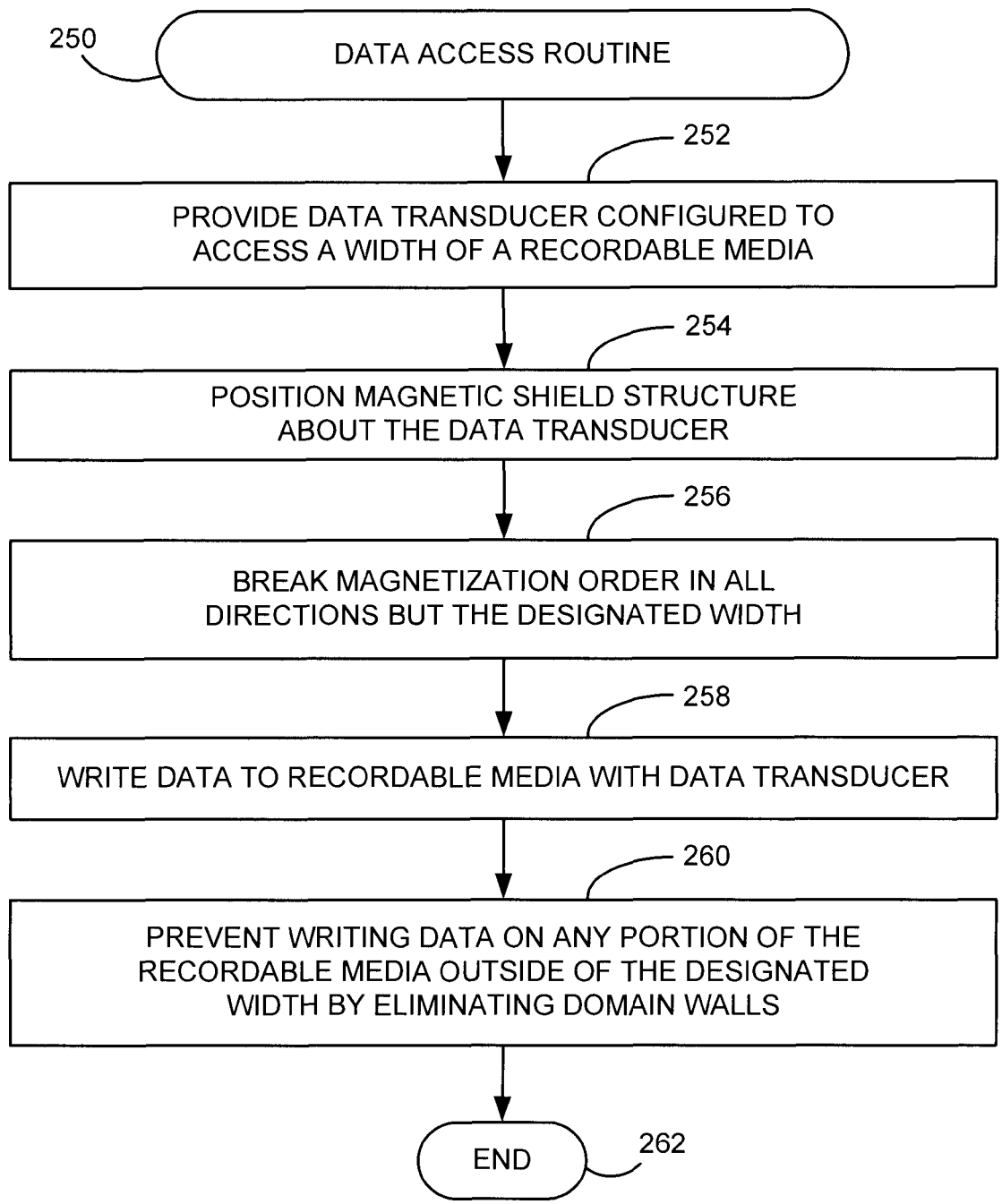
FIG. 7 provides a flowchart of an exemplary DATA ACCESS ROUTINE carried out in accordance with various embodiments of the present invention.

FIG. 7 provides a data access routine 250 conducted in accordance with various embodiments of the present invention. The routine 250 initially provides a data transducer at step 252 that is configured to access a predetermined width of a recordable media. Step 254 continues to positions a magnetic shield structure about the data transducer. In some embodiments, the magnetic shield structure surrounds the data transducer to define a path between the transducer and the corresponding recordable media that is the predetermined width. Such configuration provides a single non-magnetically shielded data access pathway that does not include any exchange decoupled material.

In step 256, the magnetic shield structure breaks the magnetization order in all directions except the designated width. That is, the any magnetization fields are met and broken by exchange decoupled material except a data access pathway that corresponds to the predetermined width. The data access pathway is used in step 258 as data is written to the recordable media with the data transducer. As such, a magnetic flux will program a logical state to the recordable media in the shape of the predetermined width. Step 260 prevents writing data on any portion of the recordable media outside the predetermined width by reducing domain wall size and eliminating the formation of cohesive domain walls in the magnetic shield structure. As a result, a logical state will only be written to a predetermined area of the recordable media and any read operations will have a low signal to noise ratio.

It can be appreciated that the material and configuration of the data transducer provides advantageous operational characteristics. For example, the lack of domain walls and breaking of magnetization order in all directions allows for a precise focusing of a data accessing width on a corresponding recordable media. Moreover, the various embodiments discussed herein can inhibit the development and exaggeration of any STE phenomenon that could affect portions of the recordable media outside the predetermined width. It will be appreciated that the claimed invention can readily be utilized in any number of other applications, including non-data storage device applications.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a data transducer that accesses a designated width of a recordable media; and
    a magnetic shield layer defining the designated width by being positioned adjacent the data transducer so that magnetization order is broken in all directions except the designated width, wherein the magnetic shield layer comprises magnetic material and non-magnetic exchange decoupled grains that inhibits the formation of domain walls.

2. The apparatus of claim 1, wherein the exchange decoupled grains comprise a doped substance.

3. The apparatus of claim 2, wherein the doped substance is chosen from the group of Oxygen, Copper, and Chromium.

4. The apparatus of claim 1, wherein the exchange decoupled grains comprise a metal alloy.

5. The apparatus of claim 4, wherein the metal alloy is CoNiFeO or CoNiFeOCu.

6. The apparatus of claim 1, wherein the exchange decouple grains comprise an oxidized material.

7. The apparatus of claim 1, wherein the magnetic shield layer structure has a high permeability and a short exchange length.

8. The apparatus of claim 1, wherein the data transducer has six sides and the magnetic shield layer is coupled to five of the six sides of the data transducer while excluding an active surface that faces the recordable media.

9. The apparatus of claim 1, wherein the magnetic shield layer is a single piece of magnetic and non-magnetic material.

10. The apparatus of claim 1, wherein the data transducer is a magnetoresistive (MR) element configured to write data to the recording media.

11. The apparatus of claim 1, wherein the data transducer is a magnetoresistive (MR) element configured to read data from the recording media.

12. The apparatus of claim 1, wherein the data transducer has a plurality of magnetoresistive (MR) elements that can read and write data, respectively.

13. The apparatus of claim 12, wherein the magnetic shield layer is positioned about each MR element independently.

14. The apparatus of claim 1, wherein the magnetic shield layer is part of a shield structure comprising of a front shield, back shield, top shield, and a plurality of side shields that each comprise a single layer of exchange decoupled material.

15. The apparatus of claim 1, wherein the magnetic material and non-magnetic exchange decoupled grains have multiple different magnetization domains that produce a substantially zero net magnetization.

* * * * *